(12) United States Patent
Glaser et al.

(10) Patent No.: US 9,914,426 B2
(45) Date of Patent: Mar. 13, 2018

(54) MOTOR VEHICLE AIRBAG SYSTEM

(71) Applicant: GM GLOBAL TECHNOLOGY OPERATIONS LLC, Detroit, MI (US)

(72) Inventors: Carsten Glaser, Ruesselsheim (DE); Markus Fischer, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 5 days.

(21) Appl. No.: 15/059,664

(22) Filed: Mar. 3, 2016

(65) Prior Publication Data
US 2016/0257279 A1 Sep. 8, 2016

(30) Foreign Application Priority Data

| Mar. 4, 2015 | (DE) | ........................ 10 2015 002 698 |
| Mar. 27, 2015 | (DE) | ........................ 10 2015 004 032 |

(51) Int. Cl.

| B60R 21/264 | (2006.01) |
| B60R 21/237 | (2006.01) |
| B60R 21/213 | (2011.01) |
| B60R 21/232 | (2011.01) |
| B60R 21/261 | (2011.01) |
| B60R 21/262 | (2011.01) |
| B60R 21/16 | (2006.01) |
| B60R 21/26 | (2011.01) |

(52) U.S. Cl.
CPC ............ *B60R 21/264* (2013.01); *B60R 21/16* (2013.01); *B60R 21/213* (2013.01); *B60R 21/232* (2013.01); *B60R 21/237* (2013.01); *B60R 21/262* (2013.01); *B60R 2021/2617* (2013.01); *B60R 2021/26076* (2013.01)

(58) Field of Classification Search
CPC ... B60R 21/264; B60R 21/237; B60R 21/213; B60R 21/232; B60R 21/26; B60R 21/261; B60R 21/262; B60R 2021/2615; B60R 2021/2612; B60R 2021/2617; B60R 2021/26076; B60R 2021/26029; B60R 2021/26041
USPC ..... 280/730.2, 736, 740, 741, 742; 102/530, 102/531
See application file for complete search history.

(56) References Cited

U.S. PATENT DOCUMENTS

| 6,502,857 B2 | 1/2003 | Nakanishi et al. |
| 6,543,804 B2 | 4/2003 | Fischer |

(Continued)

FOREIGN PATENT DOCUMENTS

| DE | 29610920 U1 | 8/1996 |
| DE | 29702008 U1 | 3/1997 |

(Continued)

OTHER PUBLICATIONS

German Patent Office, German Search Report for German Application No. 102015004032.4, dated Apr. 30, 2015.

*Primary Examiner* — Keith Frisby
(74) *Attorney, Agent, or Firm* — Lorenz & Kopf LLP

(57) ABSTRACT

An airbag system for a motor vehicle includes an airbag arrangement with at least one airbag and a gas generator for filling the airbag arrangement. A base body includes two end regions, and an ignition element protrudes from the base body between the two end regions. The folded airbag arrangement in a packed state envelops at least one of the end regions in multiple layers on one part of its outer periphery.

12 Claims, 1 Drawing Sheet

(56) References Cited

U.S. PATENT DOCUMENTS

| | | | |
|---|---|---|---|
| 6,588,796 B2 * | 7/2003 | Webber | B60R 21/213 |
| | | | 280/730.2 |
| 6,848,708 B2 | 2/2005 | Green et al. | |
| 7,213,838 B2 | 5/2007 | Teramoto et al. | |
| 8,523,222 B2 | 9/2013 | Scott et al. | |
| 2004/0212179 A1 * | 10/2004 | Aoki | B60R 21/232 |
| | | | 280/730.2 |
| 2005/0062273 A1 * | 3/2005 | Matsuda | B60R 21/272 |
| | | | 280/737 |
| 2005/0230949 A1 * | 10/2005 | Blackburn | B60R 21/2644 |
| | | | 280/736 |
| 2006/0033318 A1 * | 2/2006 | Ryan | B60R 21/232 |
| | | | 280/743.1 |
| 2007/0102907 A1 | 5/2007 | Bowers | |
| 2011/0109069 A1 * | 5/2011 | Rick | B60R 21/261 |
| | | | 280/736 |

FOREIGN PATENT DOCUMENTS

| | | |
|---|---|---|
| DE | 19738741 A1 | 3/1999 |
| JP | 2004182038 A | 7/2004 |
| WO | 2007010247 A2 | 1/2007 |

* cited by examiner

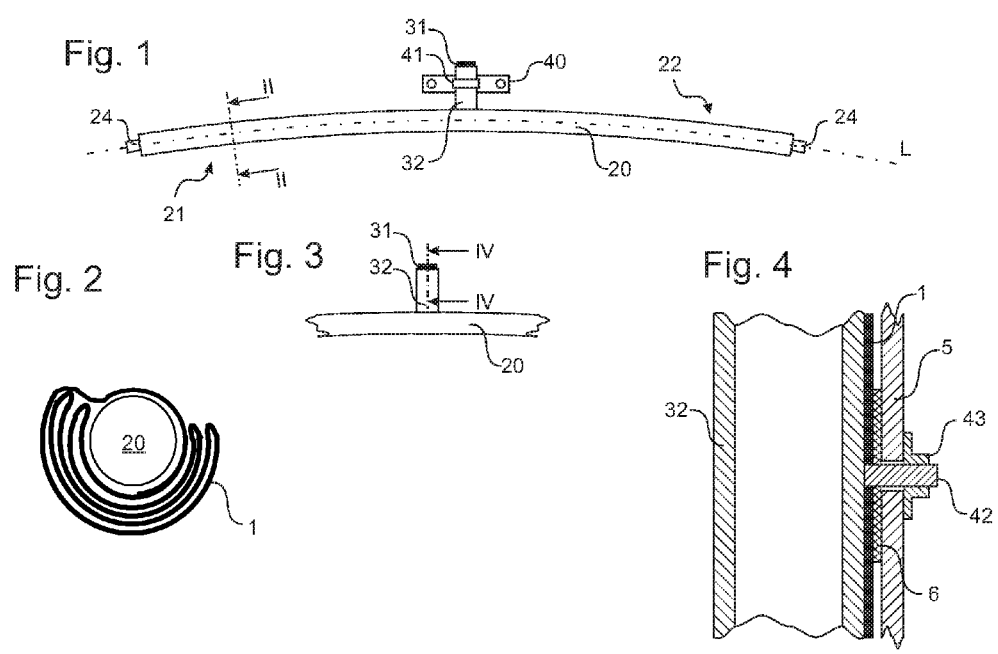

MOTOR VEHICLE AIRBAG SYSTEM

CROSS-REFERENCE TO RELATED APPLICATION

This application claims priority to German Patent Application No. 102015002698.4, filed Mar. 4, 2015 and to German Patent Application No. 102015004032.4, filed Mar. 27, 2015, which are incorporated herein by reference in their entirety.

TECHNICAL FIELD

The present disclosure pertains to an airbag system for a motor vehicle, a motor vehicle, in particular a passenger car, with the airbag system, as well as a method for manufacturing and a method for fastening the airbag system.

BACKGROUND

Known from WO 2007/010247 A2 is an airbag system for a motor vehicle that includes two airbag chambers and a double-ended filling device. The two chambers are connected by a passage. The filling device includes an assembly step and an electrical connection lying opposite the assembly step.

SUMMARY

In accordance with an embodiment of the present disclosure a motor vehicle with an airbag system is provided. In one aspect of the present disclosure, an airbag system for a motor vehicle that is fastened to a structure of the motor vehicle having an airbag arrangement with one, two or more airbags. Two or more airbags can be jointly, in particular integrally, configured with each other as chambers in a shared sleeve, or separately.

In an embodiment, the airbag system includes a hanger-like or hanger-shaped gas generator for filling the airbag arrangement with a base body having two end regions opposing each other in a longitudinal direction, and an ignition element that is situated on the base body in the longitudinal direction between the two end regions or opposing end faces, and sticks out or protrudes from the base body.

In an embodiment, one or both end sections each extend over at least 25%, in particular at least 37.5%, and/or at most 50%, in particular at most 37.5% of the length of the base body away from its end faces and toward each other. In a further development, the two end sections together include the base body, or the base body consists of the two end sections. The ignition element situated between the two end regions is then centrally arranged on the base body in a further development. In an embodiment, one or both end sections each include a circular outer periphery over at least 75% of their length.

In an embodiment, the base body, in particular one or both end sections, stores compressed gas and/or accommodates material that releases, or otherwise generates gas for filling the airbag arrangement in a chemical reaction, such as via combustion. In an embodiment, the ignition element is set up to release the compressed gas, in particular to open, in particular destroy, a barrier that blocks the flow path to the airbag arrangement, and/or to trigger the chemical reaction of the material, in particular ignite the material. In an embodiment, the ignition element can be electrically actuated or triggered, and/or includes an electrical connection for this purpose, in particular on an end face of a housing of the ignition element facing away from the base body. This advantageously makes the connection accessible in an embodiment.

In an embodiment, the folded airbag arrangement in a packed state encompasses at least 25% of the length of the base body and/or one or both end regions, in particular on or over the entire length of the end region, in multiple layers on a respective portion of its outer periphery, in particular with at least two, and preferably three layers folded one on top of the other, in particular oppositely. In an embodiment, this portion of the outer periphery measures at least 25%, in particular at least 45%, and/or at most 100%, in particular at most 80%, of the outer periphery. In an embodiment, the innermost layer of the folded airbag arrangement contacts the outer periphery of the base body, in particular of the end region(s).

In an embodiment, the gas generator or its base body can as a result be advantageously integrated into the folds of the airbag arrangement, so that the required installation space can be reduced.

In an embodiment, one or both end regions of the base body each include a maximum periphery of at most 80 mm, in particular of at most 60 mm, in particular of at most 50 mm. Additionally or alternatively, one or both end regions in an embodiment each include a minimum and/or averaged periphery of at least 15 mm, in particular of at least 30 mm, in particular of at least 40 mm.

In an embodiment, this reduction in periphery relative to conventional gas generators makes it possible to especially advantageously integrate the base body into the folds of the airbag arrangement. If an end region of the base body includes a circular outer periphery, then in an embodiment, it correspondingly includes a maximum diameter of at most 25 mm, in particular of at most 19 mm, in particular of at most 16 mm. Additionally or alternatively, it includes a minimum and/or averaged diameter of at least 5 mm, in particular of at least 10 mm, in particular of at least 13 mm.

In an embodiment, at least one outflow nozzle with one or more outflow openings are situated on the end face of one or both end regions to fill the airbag arrangement. In an embodiment, one or more outflow openings are situated on an end face of an outflow nozzle facing away from the end region. Additionally or alternatively, one or more outlet openings are situated on a shell surface of an outflow nozzle in an embodiment. An end region and an outflow nozzle situated thereon can be fabricated integrally with each other, or be joined together then or later, in particular materially. In an embodiment, at least one of the outflow nozzles includes a smaller maximum periphery than the end region on whose end face it is situated. In an embodiment, this makes it possible to improve filling and/or reduce the required installation space.

In an embodiment with or without an outflow nozzle, the base body, in particular one or both end regions, additionally or alternatively includes one or more outflow openings for filling the airbag arrangement. In an embodiment, the base body correspondingly includes one or two end regions for filling the airbag arrangement and/or one or two outflow nozzles for filling the airbag arrangement, wherein at least one of the two end regions is set up in a further development to also fill or not to fill the airbag arrangement in an embodiment with one or two outflow nozzles for filling the airbag arrangement.

In an embodiment, the base body is completely situated inside of the airbag arrangement, in particular inside of an airbag of the airbag arrangement. In an embodiment, this makes it possible to improve filling and/or reduce the required installation space. In another embodiment, the base body is situated at least partially outside of the airbag arrangement or its finable interior volume.

In an embodiment, the two end regions are each directly connected with the airbag arrangement, and can in particular engage into the same airbag or different airbags. In a further development, a respective grommet of the airbag arrangement envelops an outer periphery of the end region, and in a further development is frictionally secured to the latter by a clamping device, in particular a clip.

In an embodiment, the ignition element includes an in particular at least essentially cylindrical and/or rigid housing, which sticks out or protrudes from the in particular at least essentially cylindrical and/or rigid base body, and a single- or multi-part fastening device for fastening this housing to a structure, in particular body, of the motor vehicle. In a further development, the housing fastened to the structure contacts the structure.

In an embodiment, using the ignition element housing protruding from the base body for fastening purposes makes it possible to improve fastening and/or reduce the required installation space.

In an embodiment, the fastening device includes one or more bolts and a (respective) nut, in particular a bolted nut, in particular a mushroom head nut, which can be bolted thereto. The bolt is fixed to the housing in an embodiment, in particular materially bonded to the housing or integrally designed with the latter. In an embodiment, for fastening purposes, the bolt passes through a passage opening in the structure, in particular body, of the motor vehicle, and in a further development, also through a passage opening in the airbag arrangement, wherein the structure and possibly also the airbag arrangement are or will be clamped between the housing and nut. A gasket can be situated between the airbag arrangement and the structure.

In an embodiment, this makes it possible to achieve an especially compact and/or reliable attachment.

In an embodiment, the fastening device includes a fastening flange that can be fastened, in particular will be fastened or is fastened, to the structure detachably, in particular via bolting, or materially, in particular via adhesive bonding, welding or soldering. In an embodiment, the fastening flange is or will be detachably fastened to the housing, in particular by means of a clip. As a result, the disassembly can be improved in an embodiment.

In an aspect of the present disclosure, a motor vehicle, in particular a passenger car includes an airbag system described herein. In an embodiment, the airbag arrangement includes a side and/or head airbag. In a further development, the gas generator, in particular the housing of its ignition element, will be or is situated on the roof side, in particular on a roof side member, and/or in the area of a central vertical body pillar, in particular a B- or C-pillar, which is situated between a front vertical body pillar, in particular an A-pillar, and a rear vertical body pillar, in particular a C- or D-pillar.

In an embodiment, a longitudinal or central axis of one or both end regions is curved in sections or over its entire length in the same direction, in particular congruently, with an adjacent body structure, in particular a roof side member, of the motor vehicle. In particular for this purpose, one or both end regions in an embodiment include a curved longitudinal or central axis in sections or over their entire length.

In an embodiment, adjusting at least the end regions of the base body of the motor vehicle makes it possible to advantageously reduce the required installation space.

In an aspect of the present disclosure, in order to manufacture an airbag system described herein, the airbag arrangement is folded into several layers, and these folds are situated at one or both end regions in such a way as to envelop the latter over the part of its outer periphery with multiple layers.

In an aspect of the present disclosure, in order to fasten an airbag system described herein to a structure of a motor vehicle, the housing of the ignition element is fastened, in particular detachably and/or frictionally, to the structure of the motor vehicle, in particular via bolting.

BRIEF DESCRIPTION OF THE DRAWINGS

The present disclosure will hereinafter be described in conjunction with the following drawing figures, wherein like numerals denote like elements.

FIG. 1 shows an airbag system of a motor vehicle according to an embodiment of the present disclosure;

FIG. 2 is a section along line II-II on FIG. 1;

FIG. 3 shows an airbag system according to another embodiment of the present disclosure in an illustration corresponding to FIG. 1; and FIG. 4 is a section along line IV-IV on FIG. 3.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

FIG. 1 shows an airbag system of a motor vehicle according to an embodiment of the present disclosure, while FIG. 2 shows a section along line II-II. The airbag system includes an airbag arrangement 1 (see FIG. 2), which has been omitted on FIG. 1 to more clearly illustrate a gas generator of the airbag system. The gas generator includes a base body 20 with two end regions 21, 22 lying opposite each other for filling the airbag arrangement and an ignition element with a housing 32 that is situated centrally between the two end regions 21, 22 on the base body 20 and protrudes from the base body 20. In the exemplary embodiment, the two end sections 1, 22 extend over 50% of the length of the base body 20 away from its end faces and toward each other, so that they together include the base body 20. Both end sections 21, 22 each include a circular outer periphery over their respective length. The ignition element can be electrically actuated, and for this purpose includes an electrical connection 31 on an end face of the housing 32 of the ignition element facing away from the base body 20.

As evident on FIG. 2, the folded airbag in the packed state depicted on the figures envelops both end regions 21, 22 at about 60% of their respective outer periphery with at least five layers folded oppositely to each other. For manufacturing purposes, the airbag arrangement 1 is correspondingly folded in multiple layers, and these folds are situated at both end regions 21, 22 in such a way as to envelop the latter in multiple layers over about 60% of its periphery, wherein an innermost layer contacts the outer periphery. Both end regions 21, 22 each include a periphery of between 40 and 80 mm.

Situated at the end face of both end regions 21, 22 is a respective outflow nozzle 24 with several outflow openings (not shown) for filling the airbag arrangement 1, which includes a smaller maximum periphery than the end region 21 or 22 on whose end face it is situated. In an embodiment, one or both end regions 21, 22 can additionally also include outflow openings (not shown) for filling the airbag arrangement 1, or also have no outflow openings. In a modification not depicted, no outflow nozzles are present, wherein the airbag arrangement 1 then can be or is filled via the outlet openings of one or both end regions 21, 22. The ignition element includes a fastening device for fastening the cylindrical, rigid housing 32 to a body of the motor vehicle.

In the embodiment shown on FIG. 1, a fastening device includes a fastening flange 40, which will be or is fastened to the body via bolting. The fastening flange 40 is fastened to the housing 32 of the ignition element by means of a clamp 41. For fastening purposes, the housing 32 of the ignition element is fastened to the body 5 of the motor vehicle by bolting the fastening flange 40.

The airbag arrangement 1 forms a side head airbag. To this end, for example, the housing 32 is fastened on the roof in the area of a B-pillar (not shown) of the motor vehicle. A longitudinal axis L of the two end regions 21, 22 is curved in the same direction with a roof side member of the motor vehicle.

FIG. 3 shows an airbag system according to another embodiment of the present disclosure in an illustration corresponding to FIG. 1, wherein the base body 20 is depicted broken open, while FIG. 4 presents a section along line IV-IV. Mutually corresponding features are identified by identical reference numbers, so that reference will be made to the above description, and only differences will be discussed below.

In the embodiment in FIGS. 3 and 4, the fastening device includes a bolt 42 and a mushroom head nut 43 bolted thereto. The bolt 42 is materially bonded with the housing 32 of the ignition element. For fastening purposes, it runs through a passage opening in the body 5 of the motor vehicle, and a passage opening in the airbag arrangement 1, wherein the body 5 and airbag arrangement 1 are clamped between the housing 32 and nut 43. Situated between the airbag arrangement 1 and body 5 is a seal 6. For fastening purposes, the housing 32 of the ignition element is fastened to the body 5 of the motor vehicle by bolting the bolt 42.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An airbag system for a roof of a motor vehicle comprising:
    an airbag arrangement with at least one airbag; and
    a gas generator for filling the airbag arrangement, the gas generator including a base body that extends along a curved longitudinal axis, the base body having two end regions that are opposite each other along the longitudinal axis, the end regions each include an outflow nozzle for filling the airbag arrangement on an end face of the respective end region, the base body situated completely inside of the airbag arrangement and an ignition element protruding outwardly from the base body between the two end regions;
    wherein the airbag arrangement in a packed state envelops a portion of an outer perimeter of both of the end regions with multiple layers folded one on top of the other and oppositely to each other about the portion of the outer perimeter to surround the end regions along the portion of the outer perimeter.

2. The airbag system according to claim 1, wherein the end regions enveloped by the airbag arrangement in the packed state have a maximum periphery of at most 80 mm and the multiple layers are situated on the end regions in such a way as to envelop at least 60% of the outer perimeter of both of the end regions with the multiple layers.

3. The airbag system according to claim 2, wherein the airbag arrangement envelops the base body, which has a maximum periphery of at most 80 mm on at least 25% of its length over a portion of an outer perimeter of the base body in the multiple layers.

4. The airbag system according to claim 1, wherein each of the outflow nozzles includes a smaller maximum periphery than the end regions.

5. The airbag system according claim 1, wherein the ignition element comprises a housing and a fastening device configured to fasten the housing to a roof of the motor vehicle.

6. The airbag system according to claim 5, wherein the fastening device comprises at least one threaded fastener fixed to the housing and a nut that is bolted thereto.

7. The airbag system according to claim 5, wherein the fastening device comprises a fastening flange detachably fastened to the housing.

8. The airbag system according to claim 1, wherein the ignition element includes an electrical connection.

9. A motor vehicle comprising a vehicle body having a roof, and having an airbag system according to claim 1, wherein the gas generator is situated on the roof.

10. The motor vehicle according to claim 9, wherein the longitudinal axis is curved to complement a roof side member of the roof.

11. The motor vehicle according to claim 9, wherein the ignition element comprises a housing, which is fastened to the roof of the vehicle body.

12. A method for fastening an airbag system to a structure of a motor vehicle according to claim 9, wherein the ignition element comprises a housing and the method comprises fastening the housing to a roof of the motor vehicle to fasten the airbag system to the roof of the motor vehicle.

* * * * *